United States Patent
Anezaki

(10) Patent No.: US 11,546,891 B2
(45) Date of Patent: Jan. 3, 2023

(54) DEVICE MANAGEMENT SYSTEM AND ITS MANAGEMENT METHOD, DEVICE AND COMMUNICATION METHOD

(71) Applicant: N sketch Inc., Tokyo (JP)

(72) Inventor: Yuki Anezaki, Tokyo (JP)

(73) Assignee: N sketch Inc., Tokyo (JP)

( * ) Notice: Subject to any disclaimer, the term of this patent is extended or adjusted under 35 U.S.C. 154(b) by 0 days.

(21) Appl. No.: 17/752,928

(22) Filed: May 25, 2022

(65) Prior Publication Data

US 2022/0386293 A1 Dec. 1, 2022

(30) Foreign Application Priority Data

May 31, 2021 (JP) .............................. JP2021-091970

(51) Int. Cl.
*H04W 72/04* (2009.01)
*H04W 4/38* (2018.01)
*H04B 10/116* (2013.01)
*H04W 84/12* (2009.01)

(52) U.S. Cl.
CPC ...... *H04W 72/0406* (2013.01); *H04B 10/116* (2013.01); *H04W 4/38* (2018.02); *H04W 84/12* (2013.01)

(58) Field of Classification Search
CPC .. H04B 10/116; H04W 4/38; H04W 72/0406; H04W 84/12
USPC ........................................................ 398/172
See application file for complete search history.

(56) References Cited

U.S. PATENT DOCUMENTS

| | | | | |
|---|---|---|---|---|
| 9,991,955 | B2 * | 6/2018 | Yamasaki | H04B 10/116 |
| 11,057,108 | B1 * | 7/2021 | Mondragon | H04B 10/516 |
| 2014/0153923 | A1 * | 6/2014 | Casaccia | H04B 10/1149 398/58 |
| 2014/0255036 | A1 * | 9/2014 | Jovicic | G07C 9/00309 398/115 |
| 2016/0132893 | A1 * | 5/2016 | Bisges | G06Q 30/016 705/304 |
| 2016/0173200 | A1 * | 6/2016 | Chaillan | H04B 10/116 398/115 |
| 2018/0041910 | A1 | 2/2018 | Wu et al. | |
| 2018/0078058 | A1 * | 3/2018 | Howell | G06Q 10/087 |
| 2018/0219623 | A1 * | 8/2018 | Bitra | H04B 10/116 |
| 2018/0248623 | A1 * | 8/2018 | Ryan | H04W 4/02 |

(Continued)

FOREIGN PATENT DOCUMENTS

| | | |
|---|---|---|
| JP | 2006-82976 A | 3/2006 |
| JP | 2010-74420 A | 4/2010 |

(Continued)

OTHER PUBLICATIONS

Japanese Office Action received in corresponding Japanese Application No. 2021-091970 dated Nov. 16, 2021.

(Continued)

*Primary Examiner* — Dalzid E Singh
(74) *Attorney, Agent, or Firm* — Mattingly & Malur, PC

(57) ABSTRACT

A device transmits data to management server via the first interface. A terminal transmits management information for the device to use the first interface to the device via the second interface by visible light communication. The device transmits the data acquired by the device to the management server via the first interface based on the received management information.

19 Claims, 11 Drawing Sheets

(56) References Cited

U.S. PATENT DOCUMENTS

| | | | |
|---|---|---|---|
| 2019/0279475 A1* | 9/2019 | Watt | G08B 5/36 |
| 2019/0356879 A1 | 11/2019 | Ishii et al. | |
| 2020/0336207 A1* | 10/2020 | Luo | H04B 10/502 |
| 2022/0094435 A1* | 3/2022 | Yamamoto | G06V 20/584 |
| 2022/0122056 A1 | 4/2022 | Maes et al. | |

FOREIGN PATENT DOCUMENTS

| | | |
|---|---|---|
| JP | 2018-23087 A | 2/2018 |
| WO | 2018/123152 A1 | 7/2018 |
| WO | 2020/169597 A1 | 8/2020 |

OTHER PUBLICATIONS

Japanese Office Action received in corresponding Japanese Application No. 2022-036640 dated Jun. 21, 2022.

* cited by examiner

FIG. 8

Device Management Table 403

| Device ID | Object ID | Flag |
|---|---|---|
| D0001 | B0001 | Done |
| D0002 | B0002 | Done |
| .... | .... | |
| M | | Not Done |
| M+1 | | Not Done |

FIG. 9

Object Management Table 404

| Object ID | Object Name | Current Value | Change History |
|---|---|---|---|
| B0001 | Black Thread | 8 (volume) | |
| B0002 | White Thread | 6 (volume) | |
| B0003 | White Cloth (Acrylic) | 18 (book) | |
| B0004 | Red Cloth (Acrylic) | 12 (book) | |
| .... | | | |
| Bn | Button (White Small) | 400 (pcs.) | |
| Bn+1 | Button (Red Middle) | 200 (pcs.) | |
| .... | | | |

FIG. 10

| SSID | Encryption Key | Object Data |
|---|---|---|

FIG. 11

| Object ID | Data Before Update | Data After Update |
|---|---|---|

DEVICE MANAGEMENT SYSTEM AND ITS MANAGEMENT METHOD, DEVICE AND COMMUNICATION METHOD

CROSS-REFERENCE TO RELATED APPLICATION

The present application claims priority from Japanese application JP2021-091970, filed on May 31, 2021, the contents of which is hereby incorporated by reference into this application.

TECHNICAL FIELD

This invention relates to a device management system and its management method, a device and a communication method, particularly a device used for IOT (Internet of Things) and its communication, management of device settings and operation, etc., and management systems and methods for goods using such systems and methods.

BACKGROUND ART

The use of the Internet of Things (IoT), in which sensors are placed in the vicinity of objects to be measured and the data detected by the sensors is collected through wireless networks, is progressing. For example, Patent Document 1 discloses a wireless communication device that can automatically receive and transmit data detected by sensors. In the case of goods management using sensors, Patent Document 2 discloses an inventory goods management system in which a non-contact wireless IC tag attached to an object is detected at the reader antenna and performs inventory control by wirelessly communicating tag information and location detection information to a base station.

CITATION LIST

Patent Document

Patent document 1: JP 2018-23087 A
Patent document 2: JP 2006-82976 A

SUMMARY OF THE INVENTION

Problems to be Solved by the Invention

For example, in the apparel industry, there are many small and medium-sized companies with a few employees or sole proprietors, who must do everything from purchasing materials, manufacturing garments, selling them, or delivering them to large apparel companies. Of course, they also need to manage the inventory of materials and manufactured goods associated with these operations.

As one response, there is a proposal to use IC tags to manage inventory of materials and manufactured goods, as described in Patent Document 2. However, a large cost is required to attach IC tags to materials and manufactured goods, install wireless equipment for this purpose, and construct an information processing system to process IC tag information. In addition, the daily operation of the system is also time-consuming, making it difficult for small and medium-sized companies and individual traders to implement the system. In addition, it is difficult to say that the operators are familiar with information processing technology and its operation. Therefore, it is desirable to have a system that enables even those who are not familiar with information processing technology to manage inventory and other goods by simple means without much workload.

Therefore, an object of the present invention is to simplify the management and operation of devices that acquire data. The present invention also is to realize an object management system using the device.

The present invention also facilitates data communication between terminals and devices.

Solutions to Problems

According to a preferred example of a device management method according to the present invention, a device management method in a system in which a device is connected to a first apparatus and a second apparatus via a network, wherein said second apparatus transmits the predetermined information used by the device to the device via the second interface by visible light communication, and said device transmits the data acquired by an acquisition unit to the first apparatus via the first interface using the predetermined information.

According to a preferred example of an object management method according to the present invention, a method for managing objects in a system comprising a device and a terminal connected to a server via a network, wherein said device and the server are connected via a first interface, and said terminal and the device are connected via a second interface with visible light communication, and said server includes:

an object management table that keeps an object ID unique to an object for each of a plurality of objects and the number of the objects corresponding to the object ID, and an object management unit for managing the correspondence between the object and the object ID and the number of objects in said object management table, wherein said terminal obtains the object ID from the server, and transmit the object ID and the management information for the device to use the first interface to said device via the second interface, wherein said device stores the received object ID and the management information in memory, and transmits data pertaining to the number of objects corresponding to the object ID to the server via the first interface based on the management information, and wherein said object management unit of said server updates said data pertaining to the number of said objects corresponding to said object ID transmitted from said device in said object management table.

The present invention is also understood as a device management system or an object management system, which realizes the above device management method or the above object management method.

According to a preferred example of a device according to the present invention, a device comprising:

an acquisition unit for acquiring data, a memory for storing at least the data acquired by said acquisition unit, a wireless communication unit for transmitting the data via a first interface with wireless communication, optical unit for detecting visible light, an optical control unit for controlling the reception of predetermined information used by the device from the other device via a second interface using visible light communication, and a control unit for controlling the wireless communication by said wireless communication unit, the visible light communication by said optical control unit and storing or reading of the memory, and wherein said control unit controls to store the predetermined information received under the control of said optical control unit in the memory and transmit the data acquired by the acquisition unit from said wireless communication unit through the first interface based on the predetermined information.

According to one preferred example of a communication method according to the present invention, a communication method between a device and a terminal, wherein said device has acquisition unit for acquiring data, a memory for storing at least the data acquired by the acquisition unit, optical unit for receiving visible light, a wireless communication unit for wireless transmission of data to other device via a first interface, and the first control unit for controlling the acquisition unit, the memory, and the optical unit and the wireless communication unit, said terminal has an input unit, a display unit and a second control unit, comprising:

displaying the predetermined information used by the device on the display screen of the display unit at the terminal, transmitting the predetermined information to the device via the second interface by visible light communication with the side with the optical unit of the device facing the display screen of the terminal at the terminal, receiving said predetermined information transmitted via the second interface by said optical unit at said device, storing said predetermined information received by said optical unit in said memory at said device; and transmitting the data stored in the memory to the other device via the first interface based on the predetermined information at said device.

According to one preferred example of a communication method according to the present invention, a method of communication between a device and a terminal, wherein said device has one or more light receiving elements that receive visible light and said terminal has an input unit, a display unit, and a control unit, comprising:

positioning one or more light emitting part of the terminal opposite the one or more light receiving elements of the device, blinking by the control unit the one or more light emitting part to transmit information input from the input unit in visible light and receiving the information from the one or more light receiving elements by the device.

Effects of the Invention

According to the present invention, the management and operation of devices that acquire data can be simplified. An object management system using devices can be realized for instance. In addition, data communication between the terminal and the device can be easily performed.

BRIEF DESCRIPTION OF THE DRAWINGS

FIG. 8 is a diagram illustrating a configuration example of a device management table.

FIG. 9 is a diagram illustrating a configuration example of an object management table.

FIG. 10 is a diagram illustrating an example of format of initial setup data.

FIG. 11 is a diagram illustrating an example format of device data.

MODE FOR CARRYING OUT THE INVENTION

The following is a detailed description of the preferred embodiment of the invention with reference to the drawings.

Embodiment 1

Figure 1:
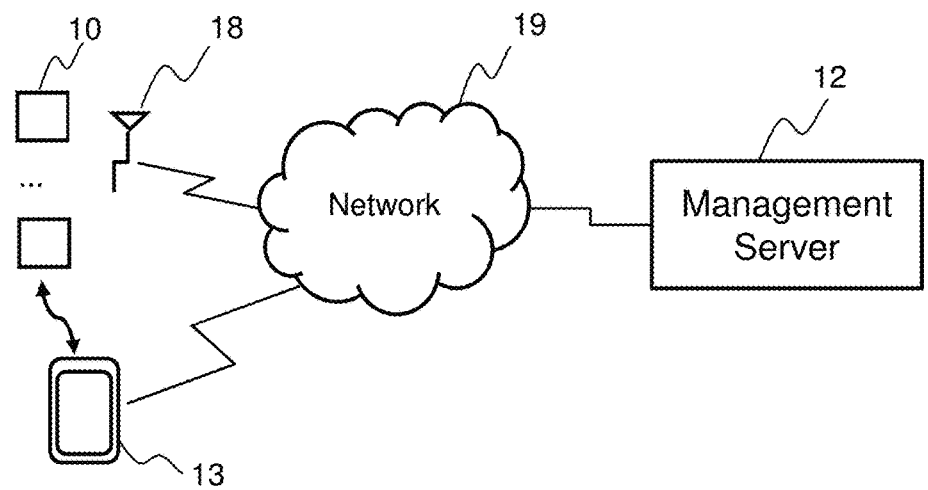
FIG. 1 is a diagram illustrating a configuration of the device management system in embodiment 1.

FIG. 1 shows a diagram of the configuration of the device management system in this embodiment.

The device management system includes a plurality of devices 10, a portable terminal 13 such as smartphones or tablets (hereinafter simply referred to as "terminal"), and a management server 12, a network 18 such as a wireless LAN and a network 19 such as a public network that connects them.

Here, the device 10 may be a sensor device that detects an object or its condition. It may be a sensor that measures for instance temperature, humidity and vibration of the object. The data detected by the device 10 can be transmitted to Wi-Fi (Wireless Fidelity (IEEE 802.11)) to the management server 12 via the wireless LAN 18 and the network 19. In this example, the device is a counter that acquires (inputs) the number (count) of goods, as it is applied to inventory management of goods. The counter is a simple configuration that can be easily operated by a user and realized at low cost. A configuration of the counter is described in detail with reference to FIG. 2. In the case of inventory management, multiple counters are placed respectively on shelves that store goods such as materials for garments (e.g., different types of yarn or cloth) or garments that have already been produced, for example. When cardboard boxes in which raw materials are stored are placed on shelves or in a warehouse, double-sided adhesive tape can be applied to the back the device 10 as the counter, and the device 10 can be fixed to the side of the cardboard.

The terminal 13 communicates with the management server 12 and the device 10 to acquire data from the management server 12 and to transmit the data to the device 10. The means of communication with the device 10 is, for example, visible light communication, which can be done by simple operation with the terminal 13. The detail of the terminal 13 is described below with reference to FIG. 3.

The management server 12 is for example a data processing apparatus that has a processing unit (CPU) managing the device 10 and the inventory status of goods and a memory unit. The detail of the management server 12 is described below with reference to FIG. 4.

Device 10

Figure 2:
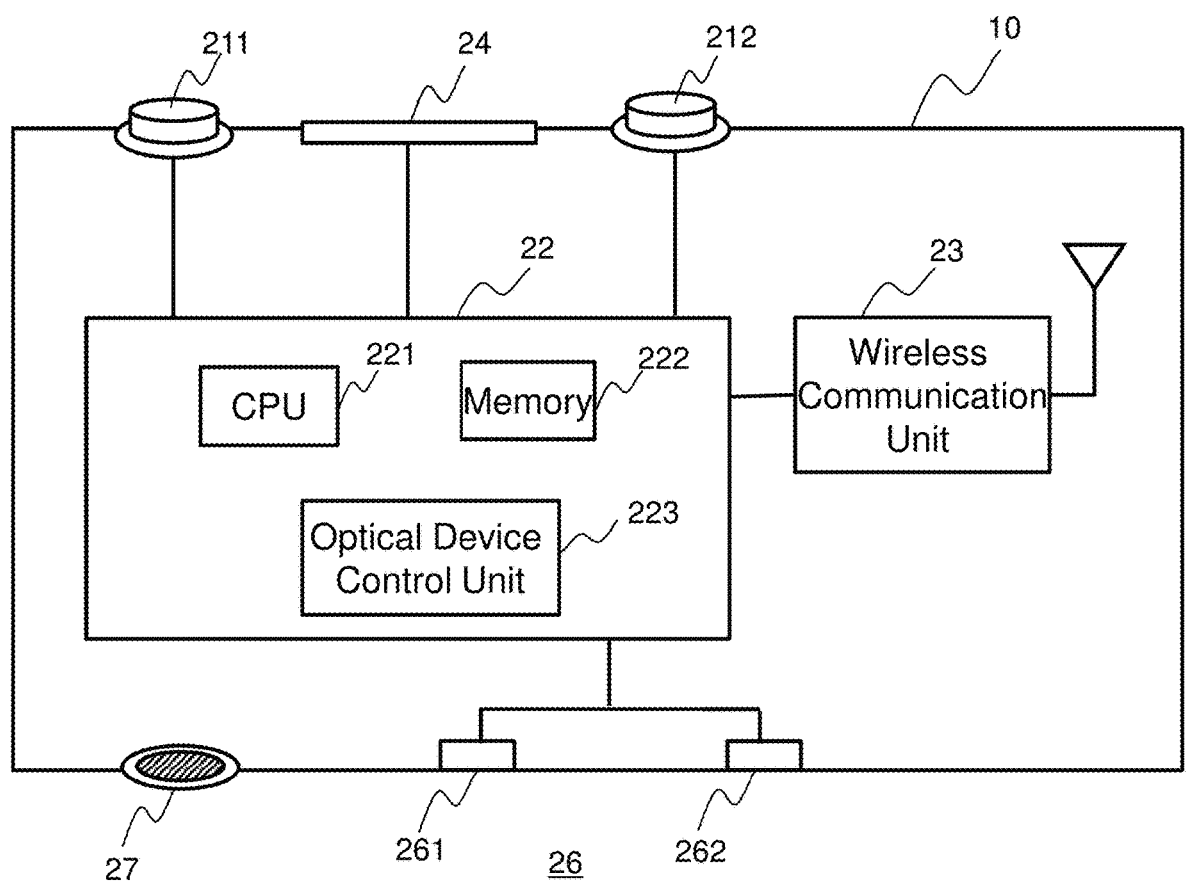
FIG. 2 is a diagram illustrating a configuration of device.

FIG. 2 shows the configuration of the device 10. The device 10 has a control unit 22, a wireless communication unit 23, a counter button 211, 212 (shown as 21 in general), a display 24, an optical element 261, 262 (shown as 26 in general), a power button 27 to realize the function of a counter. The control unit 22 has a processing unit (CPU) 221, a memory 222, and an optical element control unit 223 that controls the optical element 26. The display 24 is a liquid crystal display, for example, and displays counter values, setting data, etc. The optical element 26 is a light receiving element to perform visible light communication with the terminal 10. In one example, the optical element 261 is a light receiving element for clock synchronization, and the optical element 262 is a light receiving element that receives data in synchronization with the clock. The following is an example. The optical elements 26 may be called optical unit or visible light elements.

The wireless communication unit 23 performs the wireless communication to the management server 12 via the network 18 such as Wi-Fi. The power button 27 is a button to turn the device 10 on and off. The power button 27 is not necessarily needed if the device is set to turn on with the batteries set. The device 10 is powered by batteries (e.g., two AAA batteries) (batteries are not shown).

The counter button 211 is an add button which adds "1" to the counter value each time it is pressed. The counter button 212 is a subtract button which subtracts "1" from the counter value each time it is pressed. In the case of inventory management of goods, the user (worker) presses the subtract button 212 every time a goods is taken from the shelf where the target goods is placed and presses the add button 211 every time a goods is added. When the add button 211 or subtract button 212 is pressed, the processing unit 221 of the control unit 22 detects its condition, updates the value of the counter stored in the memory 222 and then displays the updated value (the current value) on the display 24. Thus, according to this example, the user can manage the number of inventory goods with a simple operation of pressing the counter button 21. In addition, the system for inventory management can be constructed easily and inexpensively realized.

The memory 222 in the control unit 22 stores management information for the device 10 (for example SSID and password for Wi-Fi as described below), initial values and counter values respectively in separate areas. The memory 222 also stores a unique device ID assigned in advance to each device 10.

The processing unit 221 executes programs to control each part and perform various data processing. It performs various processing, for example, it detects the press of the counter button 21 and updates the counter value in the memory 222, controls the optical element control unit 223 for visible light communication with the terminal 13, controls the device 10 to set the management information and the initial values in the memory 222, and transmits data to the management server 12 via wireless communication unit 23. The processing unit 221 executes a visible light communication control program stored in the memory 222 to realize control by the optical element control unit 223. The processing unit 221 in one example controls to receive the data of the latest value (current value) for each goods sent from the management server 12 via the network 19 and 18 and to store in the memory 222.

In this example, the transmission of management information and the initial counter values to the device 10 is performed by the visible light communication between the terminal 13 and the optical element 26 of device 10. In an example that the device 10 is connected to the management server 12 via Wi-Fi 18, the management information such as SSID and password (encryption key) for Wi-Fi is input and stored in the memory 34 in advance, and the visible light communication is performed between the terminal 13 and the optical element 26 of device 10 to set the management information in the memory 222 of the device 10. In addition, at the time of initial setup, the initial value data for each goods managed by the management server 12 is stored in the memory 222. Here, this visible light communication is referred to as the visible light communication interface.

Terminal 13

Figure 3:
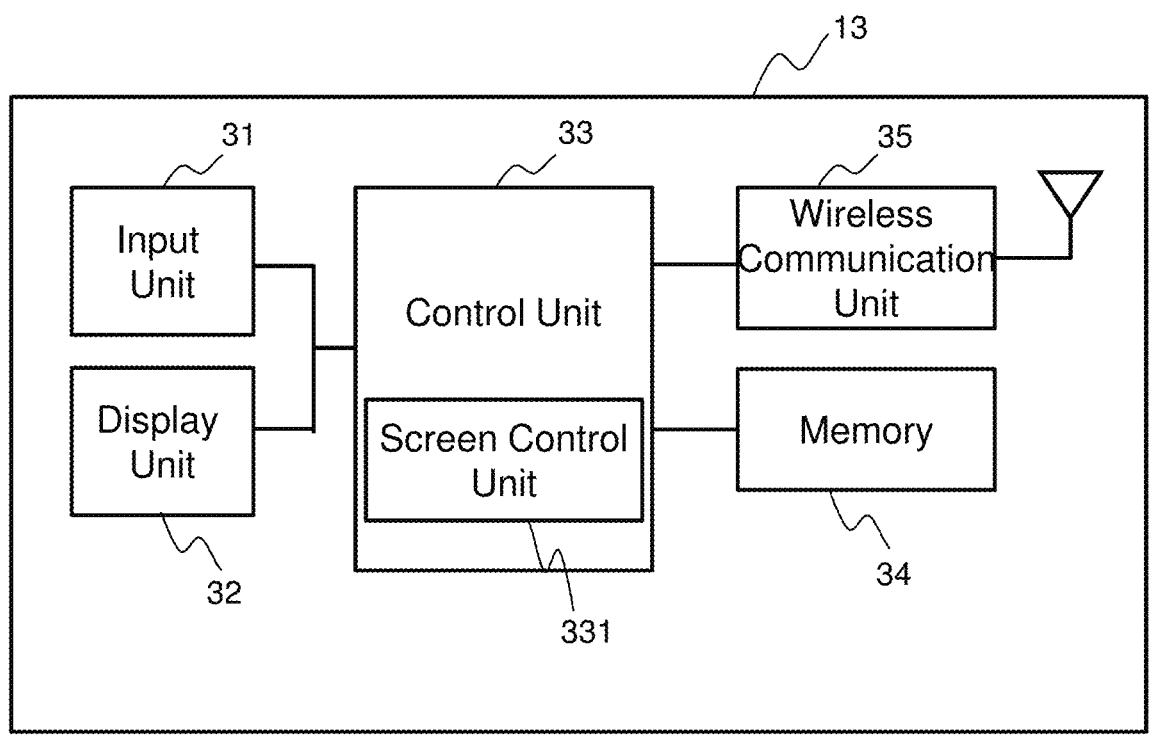
FIG. 3 is a diagram illustrating a configuration of the terminal.

FIG. 3 shows the configuration of terminal 13. The terminal 13 is a smartphone or tablet terminal for example and has an input unit 31, a display unit 32, a control unit 33, a memory 34, and a wireless communication unit 35. The display unit 32 for displaying information and the input unit 31 for receiving input by user operation are comprised by for example a touch panel display having a display screen. The memory 34 stores data (for example the management information, initial values and inventory data) and various programs. The data is acquired from the management server 12 via the wireless communication unit 35 and input from the input unit 31. The wireless communication unit 35 enables communication via Wi-Fi or the Internet.

The control unit 33 is, for example, a processor (CPU) and executes programs to control the input unit 31 and the display unit 32 and data communication control by wireless communication unit 35. It also executes various application programs to realize various functions. The screen control unit 331 which is managed by the control unit 33 controls the visible light communication between the screen control unit 331 and the optical element 26 of the device 10. The visible light communication by the screen control unit 331 is realized by executing an application for screen control, which is downloaded in advance and stored in the memory 34.

Management Server 12

Figure 4:
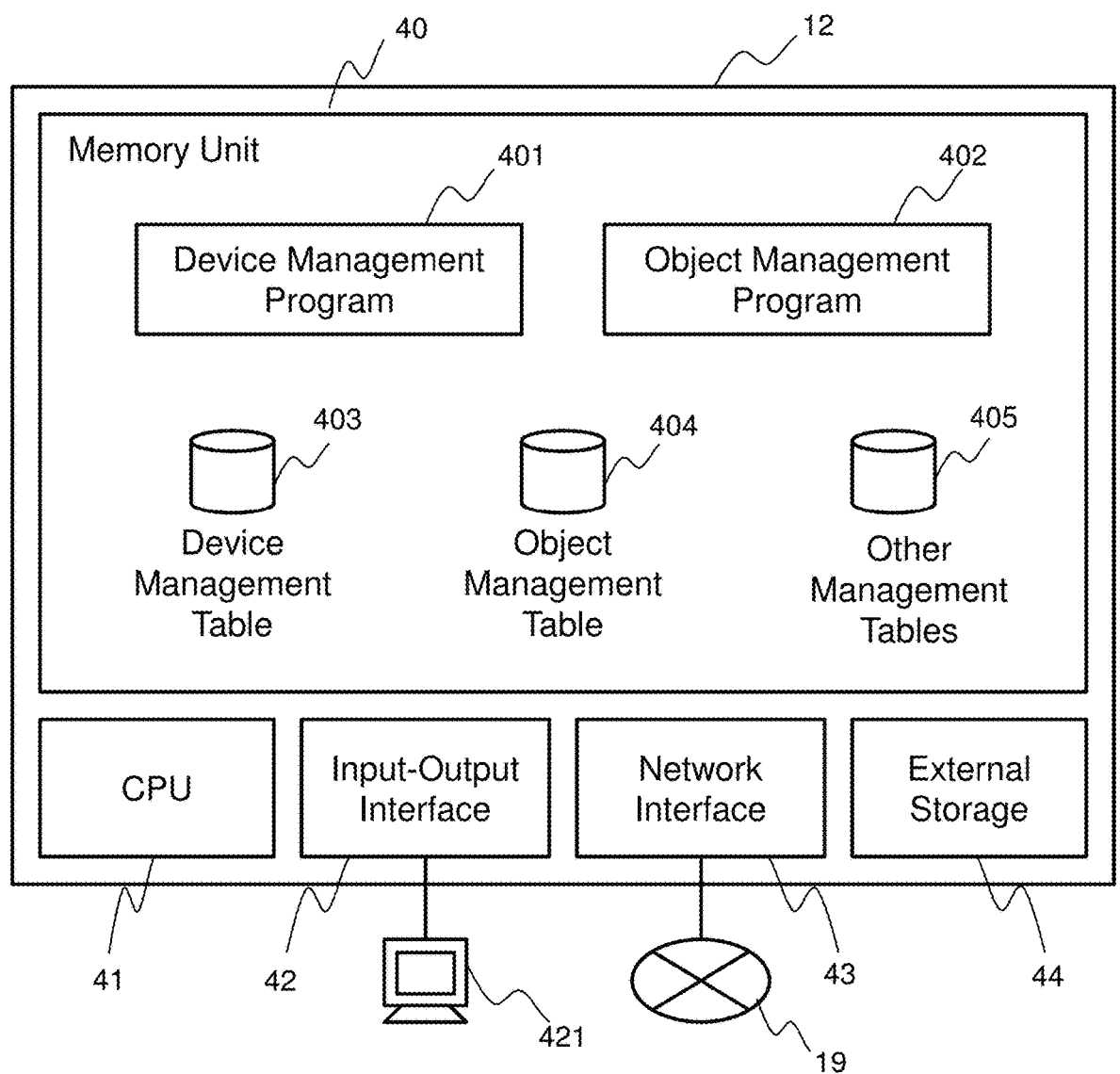
FIG. 4 is a diagram illustrating a configuration of the management server.

FIG. 4 shows the configuration of the management server 12. The management server 12 comprises a memory unit 40, a CPU 41, an input/output interface 42 connecting to an input/output device 421 for input and display, a network interface 43 connecting to network 19 and an external storage device 44. Each function of the management server 12 is realized by execution of a program that is stored in the external storage device 44 to be deployed in the memory unit 40 and executed by CPU 41. The management server 12 can communicate to the device 10 and the terminal 13 via the network interface 43. The management server 12 may be a personal computer (PC).

The memory unit 40 stores a device management program 401 that manages the device 10, an object management program 402 that manages the quantity of goods, a device management table 403, an object management table 404, and other management tables 405. The object management program 402 and the object management table 404 are used for inventory management. In addition to the above, the system may have, for example, a program and its management table for managing the status of orders and purchases of raw materials for goods, a program and its management table for managing manufactured goods (products), their delivery destinations and delivery status. Other management tables 405 may include, for example, management tables that manage the order and purchase data of the materials mentioned above, as well as the destination and delivery status of the goods.

We may say here that the functions realized by the execution of the device management program 401 may be referred to the device management unit 401, and the functions realized by the execution of the object management program 402 may be referred to the object management unit 402. The above management tables may be stored in the external storage device 44. In this example, the management tables are referred to as management tables as described above but may also be referred to as management DB (Data Base) or simply as management information. The processing operation of the above program and details of the management tables are described below.

Visible Light Communication Between Terminal 13 and Device 10

Figure 5:
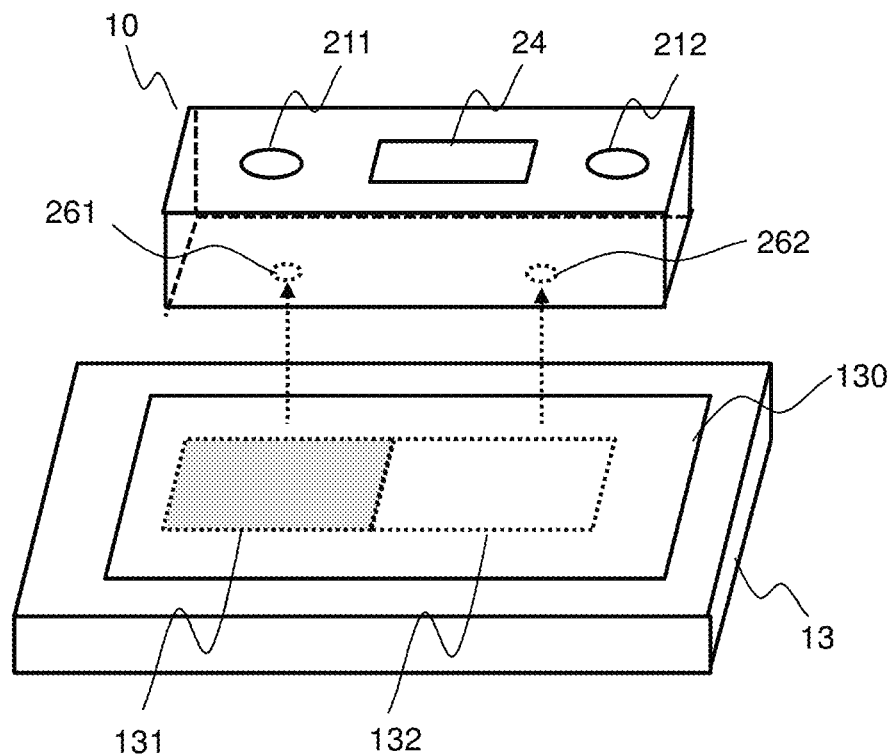
FIG. 5 is a diagram illustrating a perspective view of a concept of visible light communication between terminal 13 and device 10.
Figure 6:
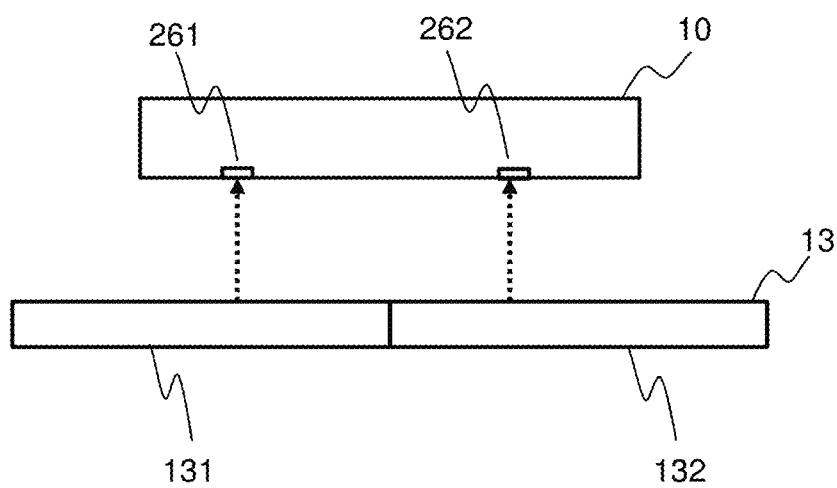
FIG. 6 is a diagram illustrating a side view of the visible light communication between terminal 13 and device 10.
Figure 7:
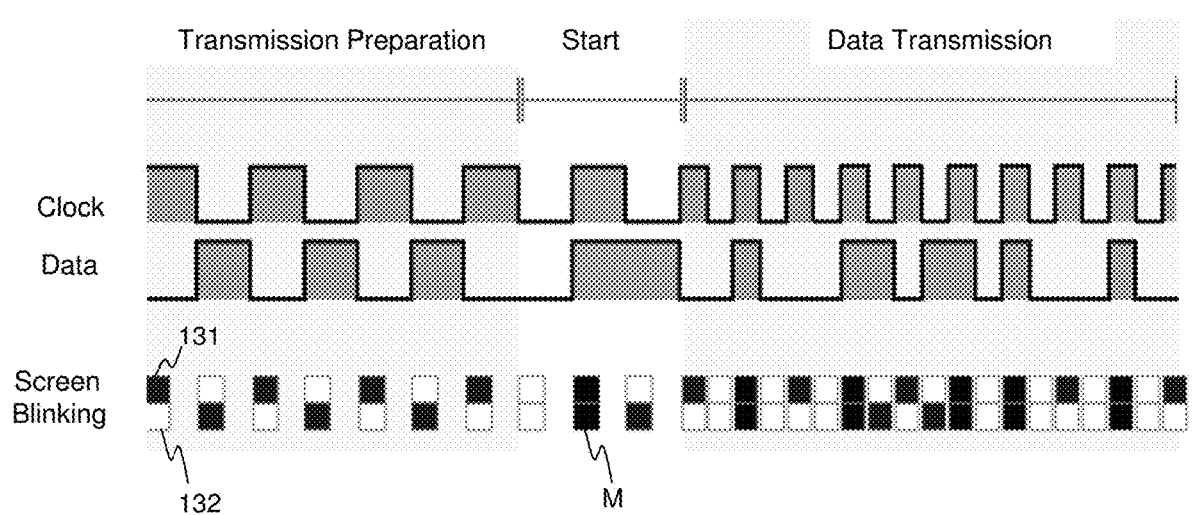
FIG. 7 is a diagram illustrating a timing chart of transmitted signals in the visible light communication between terminal 13 and device 10.

Referring to FIGS. 5 through 7, the visible light communication between the terminal 13 and the device 10 is explained.

FIG. 5 shows the relationship between the device 10 and the terminal 13 during information communication, especially shows a situation when the terminal 13 transmits data to the device 10 by visible light communication. The signs of the device 10 shows the same part as the signs shown in FIG. 2. In the terminal 13 130 indicates the display screen of the touch panel display that also serves as an input unit 31 and a display unit 32.

For convenience of understanding, the device 10 and the terminal 13 are shown away in FIG. 5, but in fact a surface with the optical element 26 of the device 10 is in contact with the display screen 130 of the terminal 13.

As shown in FIG. 6, the display screen 130 is divided into two parts and a split screen 131 and 132 is blinking respectively while the optical visible light communication is performed for the optical element 261 and 262. In other words, the screen control unit 331 blinks the split screen 131 in synchronization with the clock and the split screen 132 in synchronization with the data signal. The opposing the optical element 261 receives the clock and the optical element 262 receives the data.

Figure 13:
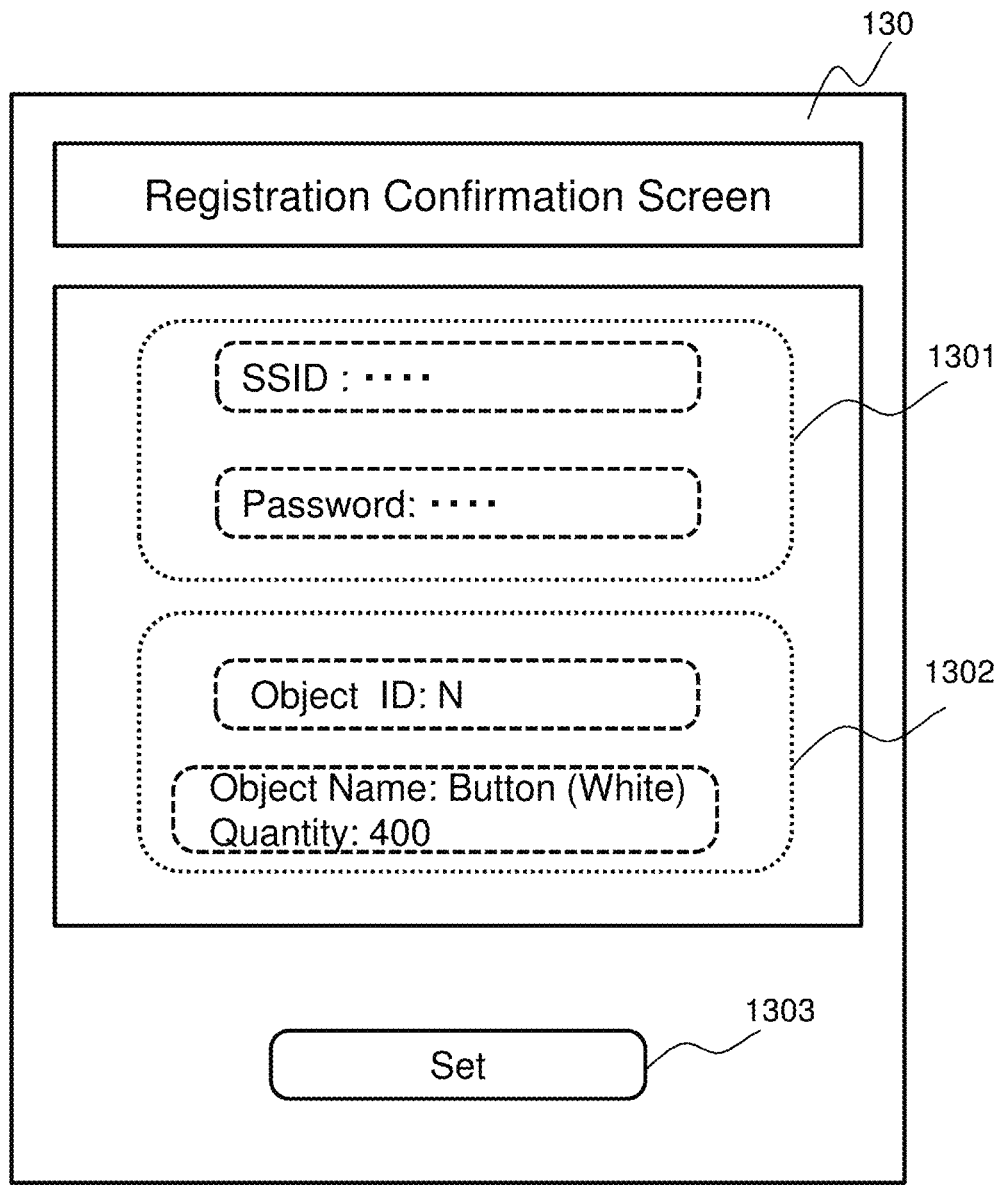
FIG. 13 is a diagram illustrating an example of display of a registration confirmation screen of the terminal.

The user operates the input unit 31 of terminal 13 to enter the SSID and the password for Wi-Fi that are used with the device 10. As shown in FIG. 13, the SSID and the password entered are displayed in the display area 1301 of the screen 130 and the information on the object ID, the name of the object, and the number of objects which are transmitted from the management server 12 are displayed in the display area 1302. These data are temporarily stored in the memory 34 of the terminal 13. When a setting button 1303 is operated by the user, the application of the visible light communication is started in the terminal 13. The management information such as the SSID and the password stored in the memory 34 and the object data such as the object IDs (including for example initial values) are transmitted to device 10 by the visible light communication. For identifying the information (e.g., the management information and the object data) transmitted between the terminal 13 and the device 10, an identification code is added to the beginning of such information.

The management information of the SSID and the passwords and the object data received by the optical element 26 (more particularly the light receiving element 262) are stored separately in areas of the memory 222 according to the identification code. Once the SSID or password is set, the data obtained by device 10 (i.e., the counter value entered with the button 21) is transmitted from the wireless communication unit 23 to the management server 12 via Wi-Fi 18 and the network 19. Note that the setting of management information such as the SSID and the password and the setting of the initial values to device 10 may be done at different times. In this case the visible light communication may be performed separately.

When using Wi-Fi for communication with the device 10, it is conceivable that the management information (the SSID and the password) could be transmitted from the terminal 13 such as the smartphone by using a common Bluetooth communication. However, pairing of Bluetooth is unstable and time-consuming nature for the connection and makes it very difficult for inexperienced users. Therefore, the inventor has developed a method of transmitting data such as the management information by the visible light communication between the terminal 13 such as a smartphone and an optical element mounted on the device 10, and then setting it up the device 10. Thereby eliminating the complications associated with setting up a communication connection and making it easier for even unfamiliar users. In the visible light communication a visible light modulator of the transmitting device (the terminal 13) modulates the transmitted data into bright and dark visible light and transmits it and the light receiving element of the receiving device (the device 10) demodulates the received visible light to acquire the data. It is a communication method (visible light communication interface) that transmits and receives desired data.

The visible light communication can be realized if the transmitting device has a display with a backlight and no special device is needed. Moreover, it is possible to divide the screen of the terminal 13 into multiple areas and transmit different modulation signals using the divided multiple areas. There is no need to install a new device for visible light transmission to an ordinary terminal, and this can be easily realized by applying a portable terminal such as a smartphone. The receiver can use inexpensive optical elements for receiving visible light. It is an advantage that does not need expensive elements such as Bluetooth.

Some innovations and advantages considered by the inventor are further described.

Since the frame rate of the screen of the terminal 13 may vary depending on the performance of the device 10, the length representing one bit may vary for each device. In addition, it is important to properly inform a timing of the bit change, since the subsequent timing will be sifted at the time of a processing failure if the processing failure occurs.

Therefore, the inventor considered timing control of the visible light communication. That is, the screen of the terminal 13 is divided into two parts as the split screen 131 and 132 and controlled so that a light/dark pattern corresponding to the clock is transmitted from the first part (for instance the split screen 131) and a light/dark pattern corresponding to the data is transmitted from the second part (for instance the split screen 132). On the other hand, the optical element 261 of the device 10 is configured to receive the clock synchronization of the light pattern (modulated pattern of the transmitted information to visible light) so that the light and dark of the optical pattern always switches at the timing of the bit change. The other optical element 262 is configured to receive the data signal based on the clock of which pattern of bits are changed.

Furthermore, the inventor has devised a way to make the visible light communication stable even if there is a blur in the brightness or processing speed of the screen of a terminal such as a smartphone. FIG. 7 shows the timing chart of the transmission signal in the visible light communication at the terminal 13. It shows the clock and the data as transmission signals and conditions of the split screens 131 and 132. The black and white of the split screens 131 and 132 shows the blinking in response to the transmitted signal. Along the passage of time (horizontal axis), the periods of preparation for transmission (start trigger), signal of start of the transmission (showing with "Start") and data transmission are set.

As shown in FIG. 7, the screen control unit 331 of the terminal 13 controls the transmission of a light/dark pattern of the clock and its inverted signal (inverted clock) with the split screens 131 and 132 during the transmission preparation period.

This causes the split screen 131 and the split screen 132 to blink alternately and repeatedly. The optical element 261 in the device 10 accordingly receives the clock and the optical element 262 receives the inverted clock. The screen control unit 331 adjusts threshold values of the clock and the transmitted data based on the light/dark pattern of the correct alternating blinking of the split screen 131 and the split screen 132. For example, the threshold values are set to a median height of signals of the clock and the transmitted data.

During the transmission start signal period after the transmission preparation period has elapsed, the screen control unit 331 applies the clock to the split screen 132 which was sending the inverted clock and then the split screens 131 and 132 become the same brightness (Shown "M" in FIG. 7). The screen control unit 331 switches then the split screens 132 for transmitting the data. On the receiving side, the optical element control unit 223 of device 10 determines the data transmission start when the optical elements 261 and 262 detect the same brightness signal (bright state) and then the optical elements 261 detects a dark state at the same timing.

The control in above period is performed to adjust the brightness of the display screen 130 of the terminal 13 and the blurring caused by the processing speed. Thereafter, the screen control unit 331 switches the split screen 131 to blink at the timing of the clock to ½ or less and to blink the split screen 132 at the timing of "1" and "0" of the transmitted data to send out respectively the light and dark patterns of the clock and the transmitted data. On the receiving side, the light/dark pattern of the clock is received by the optical element 261 and the light/dark pattern of the transmitted data is received by the optical element 262 of device 10 respectively. Note that the clock timing is switched to ½ or less to speed up the transmission speed.

Each Management Table and Data Format

FIG. 8 shows the configuration of the device management table. The device management table 403 manages a device ID that is unique to each device 10, an object ID and a flag correspondingly. The flags manage whether the device ID has been already associated with the object ID or not. The management of this association is based on the execution of the device management program 401. The Device ID and the object ID need not necessarily be recognized by the user, as long as they are managed by the system.

FIG. 9 shows the configuration of the object management table. The object management table 404 manages the object ID, an object name, a current value and a change history for all objects. All objects are all of them subject to inventory management, regardless of whether they are linked to a device 10 or not. For example, information on objects delivered based on an order or newly purchased by the user is sequentially registered in the object management table 404 through input by the input unit 31 of the terminal 13. Upon registration, the object management unit 402 generates to assign the object ID for each object registered. The current value represents the current number of objects, i.e., the latest updated value. The change history keeps a log of the previous current value every time when the number of the target object updates. The log is assigned with the time information of the update.

The user can download contents of the object management table 404 to terminal 13 to display it on the display screen to confirm the inventory status of goods.

FIG. 10 shows the format of the initial setup data. The initial setup data sent from the terminal 13 to the device 10 has the format comprising the SSID, the encryption key (password) for Wi-Fi and object data (object ID and number of objects). Note that only the SSID and the encryption key may be sent, or only the object data may be transmitted, in which case no other data is included.

FIG. 11 shows the format of device data. The device data that is sent from the device 10 to the management server 12 comprises the object ID, data before update and data after update. When the pre-update counter value held in the memory 222 has been "15" and two such objects have removed from the storage rack, the counter value after the update becomes "13" for example, the device data includes the pre-update data "15" and the post-update data "13".

Example of Screen Display of Terminal 13

FIG. 13 shows an example of the display of the registration confirmation screen of terminal 13. A confirmation screen for information to be registered in the device 10 is displayed on the screen of the touch panel that configures the input unit 31 and the display unit 32 of terminal 13. The registration confirmation screen 130 has a display area 1301 that indicates the SSID and the password for the management information of Wi-Fi, a display area 1302 that indicates the object ID, the object name, and the number of objects (object data) to be assigned to the device 10, and a setting button 1303 that is instructed by the user to register above the information. Note that the object ID does not necessarily need to be displayed since it is an administrative code.

This registration confirmation screen 130 is used to newly link the object to the device 10 and to register the management information for connecting to Wi-Fi.

The object management table 404 contains newly delivered objects, but the user has not yet assigned a device 10 to any of the objects (i.e., the objects are not connected to the device 10). The object ID, the object name and the number of objects of uncompleted objects (i.e., not yet linked to the device) are displayed in the display area 1302. The SSID and the password that the user inputs from the input unit 31 of the terminal 13 are displayed in the display area 1301.

When the user confirms the contents displayed on the registration confirmation screen 130 and presses the setting button 1303, the visible light communication is started. The information of the SSID and the password, as well as the object ID and the number of objects, are transmitted through the visible light communication interface from the terminal 13 to the device 10. The number of objects does not necessarily have to be sent first, as it can be sent later through communication between the management server 12 and the device 10. The object name and the number of objects to be registered in each device may also be entered from the input unit 31 of the terminal 13 without obtaining them from the management server 12.

Data Communication Operation

Figure 12:
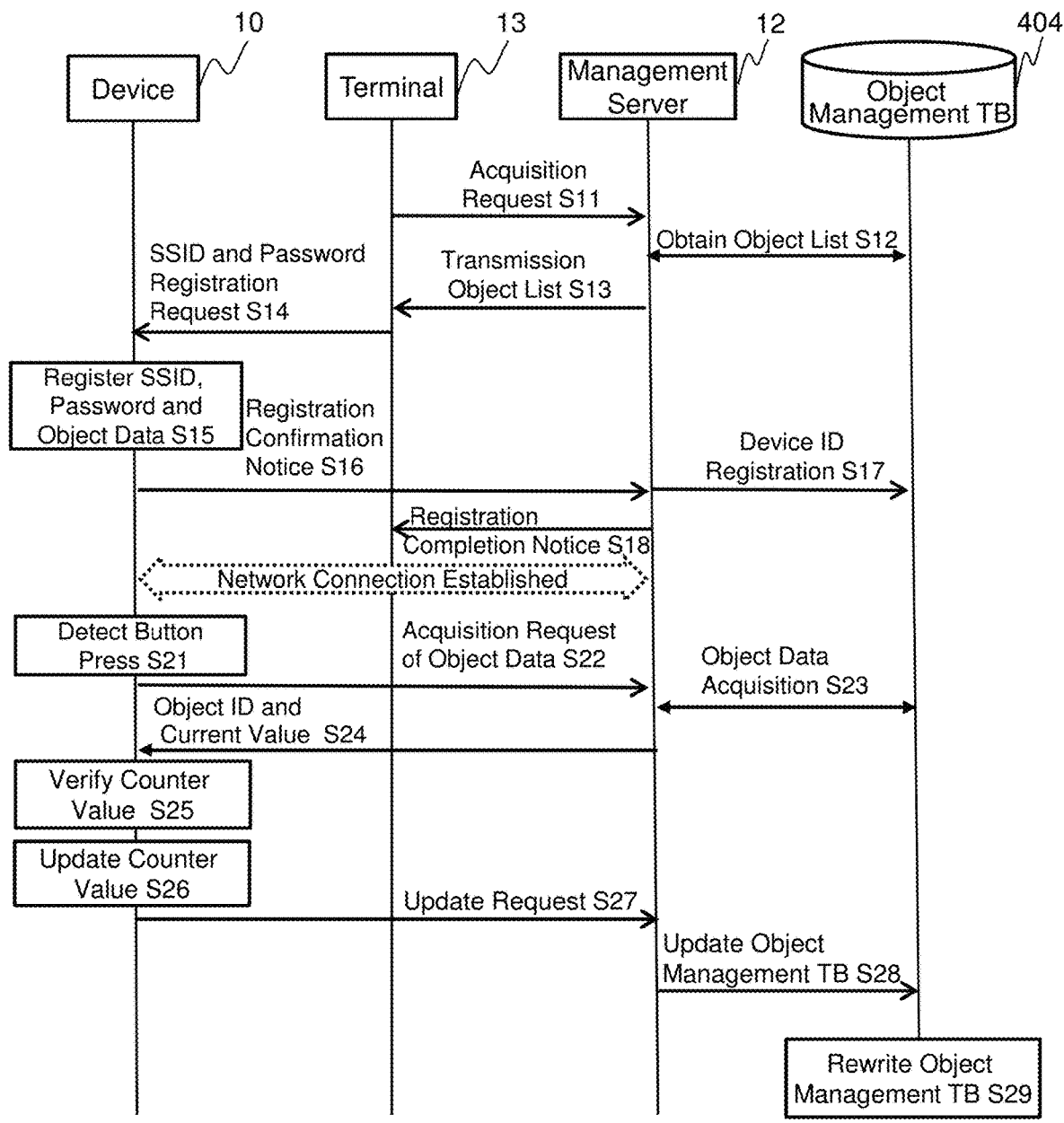
FIG. 12 is a diagram illustrating a flowchart for data communication operations between a terminal, a device, and a management server.

Next, referring to FIG. 12, the operation for setting the management information to the device 10 and the data communication with device 10 at the inventory control is explained.

The prerequisite for entering this operation is that the user is in possession of an unused device 10 with the device ID. The device ID is pre-stored in the memory 222 of the prepared device 10. In addition, there are objects around the user that have not been corresponded to the device 10. In such a situation, the operation by the user of the terminal 13 is performed to associate the object with the device 10.

First, the user operates the terminal 13 to instruct a request to the management server 12 to obtain a list of objects (an object list) (S11). This is an initial operation to link the device 10 in the user's possession with the object to be detected by the device 10. The management server 12 receives the acquisition request 11 and the object management unit 402 refers to the object management table 404 to acquire data on all the objects that are included in the object list (S12). Then the management server 12 transmits the object list to the terminal 13 as a response to the acquisition request 11 (S13). The terminal 13 receives the object list via the wireless communication unit 35 and temporarily stores it in memory 34. At the same time the contents of the object list are displayed on the screen of display unit 32.

The user can confirm the inventory status by looking at the object list (i.e., inventory list) displayed on the screen of the display unit 32. In one example the user can finish at this stage by pressing the "back key" (not shown) on the display screen. On the other hand, if the user wishes to manage the inventory of goods by using the device, the following operations are performed as in this embodiment.

Next, the user selects an object from the object list displayed on the screen by tapping the object that the user wants to link to the device. When the contents of the object management table 404 are displayed on the screen of display unit 32, the user selects the object that has not yet been tied to the device. For example, when "Bn" and "Button (white small)" (FIG. 9) are selected, the control unit 33 switches the display screen of display unit 32 to display the registration confirmation screen 130 shown in FIG. 13. The object ID, the object name and quantity (object data) that has been just selected are displayed in the display area 1302 of the registration confirmation screen 130. Furthermore, during the initial setup, the user operates the input unit 31 of the terminal 13 to input the SSID and the password for Wi-Fi that the device 10 will use. The display area 1301 will indicates this management information. It is also possible for the user to input the object name and quantity from the input unit 31 without obtaining them from the object management table 404.

If the user confirms the contents of the registration confirmation screen and finds no problems, the system is ready to send the SSID, the password and the object data from the terminal 13 to the desired device 10.

The user then places the device 10 with the optical element 26 facing to the screen of the terminal 13 and presses the setting button 1303. The screen control unit 331 of the terminal 13 is then activated to send a data registration request to the device 10. Data transmission is performed between terminal 13 and device 10 via the visible light communication interface (S14). (See FIGS. 5 to 7).

The screen control unit 331 generates the light/dark pattern that is modulated based on the SSID, the password and the object data. Under the control of the optical element control unit 223 of the device 10, the optical elements 261 and 262 receive the light/dark pattern and the CPU 221 demodulates them. The demodulated the SSID, password and the object data are stored in the memory 222 to be registered (S15). When registration is completed, the device ID stored in advance in the memory 222 is read out to be added to the registration confirmation notice and sent to the device 10 to the management server 12 (S16). When the management server 12 receives the registration confirmation notice, the device management unit 401 registers the received device ID corresponding to the object ID and set the flag to "done" in the device management table 403 (S17). Then management server 12 send a registration completion notice to the terminal 13 (S18).

This completes the series of initial setup operations for one object. Wi-Fi 18 and the network 19 connections are now available between the linked device 10 and the management server 12. If the user operates the "back button" (not displayed) on the display screen of the registration completion notification, the system returns to the process of S14 and the control unit 33 displays the screen of the object list again. Then similar to the above operation, the user can be prompted to select the objects that have not yet been tied and the above operation can be repeated.

Here, if the initial setup fails, for example, when the terminal 13 fails to receive the registration completion notice (S18) within a certain period (e.g., the occurrence of a timeout), the control unit 33 of the terminal 13 judges that the initial setup on the device 10 has failed and displays a failure of the initial setup on the screen of the display unit 32. When the user sees the failure screen and recognizes the initial setup failure, the operation from step S11 is repeated.

If the initial setup is successful, during actual operation, the control unit 22 of the device 10 detects pressing of the counter button 21 by the user's operation (S21), the CPU 221 sends a request to the management server 12 to acquire the object data (S22). The reason why the acquisition request of the object data is sent to the management server 12 is to confirm whether the value of the counter held in the memory 222 of the device 10 is equal to the current value registered in the object management table 404.

The above acquisition request is appended with the object ID. The above acquisition request is sent to the management server 12 via Wi-Fi 18 set by the SSID and the password that are registered in the memory 222 and the network 19.

At the management server 12, the object management unit 402 searches the object management table 404 to acquire the current value of the object corresponding to that object ID (S23). The current value together with the object ID is then sent to the device 10 with the requested device ID (S24).

The CPU 221 of the device 10 receives the object ID and current value and the current value is compared with the counter value (data before update) stored in the memory 222 (S25). This comparison is to verify that the counter value held by device 10 prior to updating the counter value by pressing the counter button 21 matches the current value held by the management server 12 (the current value maintained by the object management table 404). If there is a mismatch, the current value in the object management table 404 managed by the management server 12 is used as a master and the current value obtained from the management server 12 is rewritten to the counter value in the memory 222.

The CPU 221 then subtracts the number of times that is pressed by the button 212 from the latest counter value (pre-update data) in the memory 222 to store the updated value (post-update data) in the memory 222 (S26). The updated value is added when the button 211 is pressed.

The CPU 221 then attaches the data before update and the data after update (see FIG. 11) with the object ID and send an update request of the object data to the management server 12 (S27). The update request is sent via Wi-Fi 18 of which the management information is registered and the network 19.

When the management server 12 receives the update request, the object management unit 402 searches the object management table 404 with the received object ID as a key to rewrite the current value corresponding to the object ID to the updated value (S28, S29). At the same time, time information is attached to the previous current value to be stored in the change history. The above processes S21 to S29 are performed each time when the button 21 of the device 10 is pressed. In this way, the object management table 404 can keep track of the latest number of goods for each object ID.

The above is an example of a data communication operation. However, it is not necessary to always use a new device when linking the device and an object. For example, when the device used in the past is no longer needed to be associated with the object, the device may be used to associate with other new objects. For example, the device ID used in the past (e.g., D0001) may be used to link a new object ID (e.g., Bn+1) to be registered with the corresponding the object ID (e.g., Bn+1). In this case, the operations S11 to S18 above are performed and the management information and the object data of the new object are registered in the memory 222 of the device 10. This is a so-called reuse of the device and a limited number of devices can be used effectively.

It is also possible to assign multiple devices to the same object. In this case, the multiple device IDs corresponding to the same object ID are registered in multiple columns of the device management table 403. One advantage of assigning multiple devices to the same object is that, for example, one device is placed on a shelf in the warehouse where the object is stored and the other one is placed on the user's desk to monitor the inventory status of the same object.

The above process enables the linking of selected objects to the device and the device can be used to manage the inventory of objects. The user can also specify the object ID from terminal 13 or send a request to the management server 12 to obtain the object list, and then the user can select individual objects or the latest inventory data for all objects obtained from the management server 12 to confirm them displayed on the screen of the display unit 32 of the terminal 13.

Embodiment 2

The communication between the terminal 13 and the device 10 in the embodiment 1 is that the data to be transmitted is entered and displayed on the display screen of the terminal 13 and is transmitted from the terminal 13 to the device 10 by the visible light with a state of putting the device 10 on the display screen of the terminal 13, as shown in FIGS. 5, 11 and 12.

The embodiment 2 is that the terminal 13 such as a tablet device or a flat type (180 degree open/close) notebook PC (personal computer) is used and enables the visible light communication simultaneously from a single terminal 13 to the multiple devices 10. (The signs in FIG. 3 are referred for convenience of explanation in the embodiment 2.)

Figure 14:
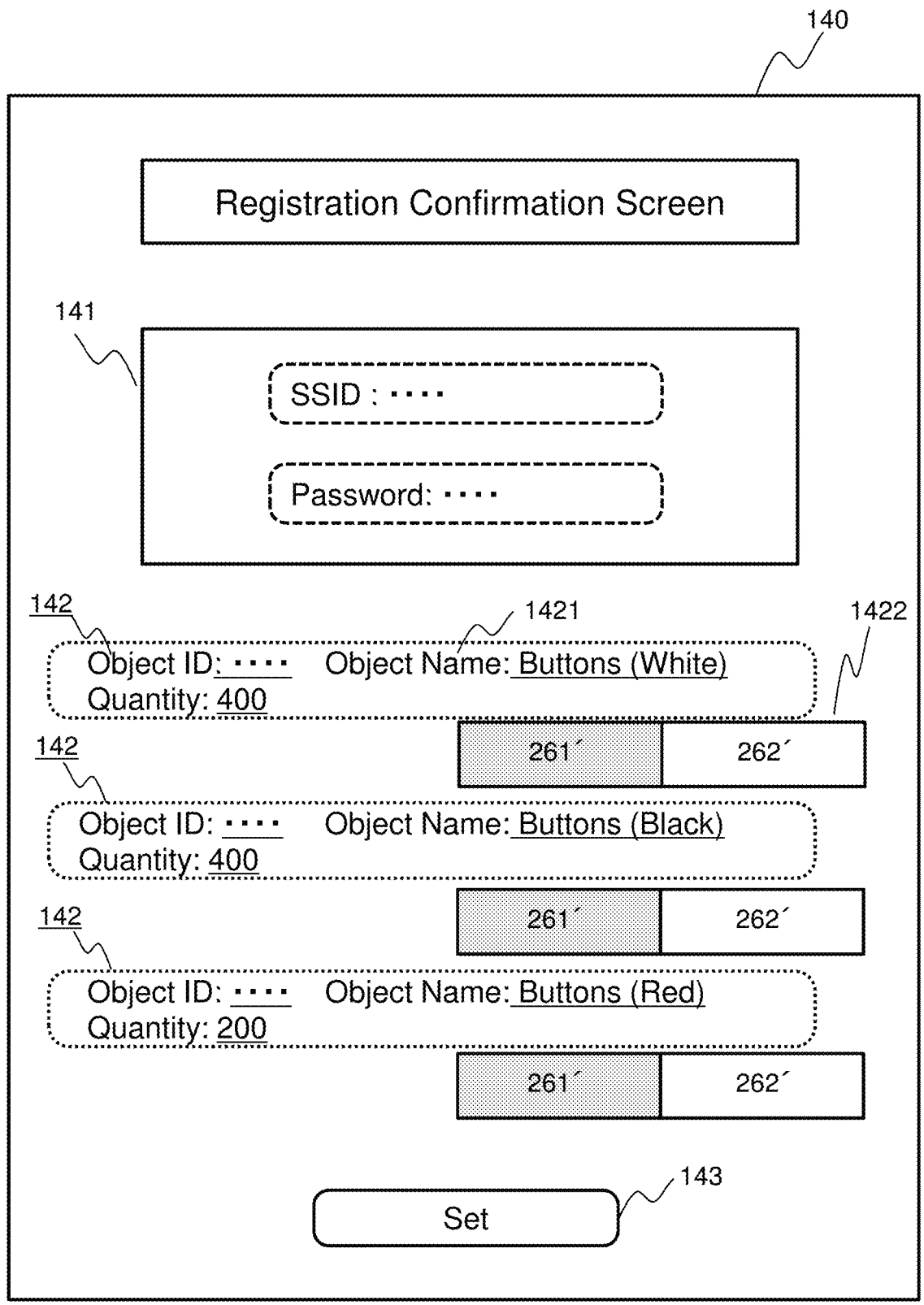
FIG. 14 is a diagram illustrating an example of display of a registration confirmation screen of the terminal in embodiment 2.

FIG. 14 shows an example of the registration confirmation screen of the terminal 13 that performs visible light communication to the multiple devices 10. As shown in FIG. 14, the registration confirmation screen 140 of the terminal 13 has a first display area 141 that indicates the SSID and the password for Wi-Fi, a second display area 142 corresponding to each of the multiple devices (the three devices are shown in FIG. 14) and a setting button 143. Each of the second display areas 142 for each device has a data display column 1421 displaying the object data (the object ID, the object name and number of the objects) and a device placement display column 1422 for placing the device to which data is to be registered. The device placement display column 1422 is preferably a quadrilateral slightly larger than the size of the light-receiving side of the device 10. This is to make the user easier to see the blinking lights of the split screens of the terminal 13 (in detail a split screen 261' and 262') during the visible light communication of data.

The display column 142 is preferably color-coded on the left and right so that the user can easily positions the optical element 261 of the device 10 to the split screen 261' on a left side and the optical element 262 to the split screen 262' on a right side. The screen control unit 331 of the terminal 13 can controls to blink the split screens 261' and 262' of each device placement column 1422 to perform the visible light communication individually per each device 10.

The SSID and the password entered by the user from the input unit 31 of the terminal 13 are displayed in the first display area 141. The object data for each of the three devices obtained from the management server 12 is displayed in each of the second display area 142. The object name and number of the objects to be registered in each device 10 may be entered from the input unit 31 of the terminal 13 without obtaining them from the management server 12. The user checks the object name and quantity of the objects for each device displayed in the second display area 142 and may correct them by operating the input unit 31 if necessary.

The user reviews the data displayed in the first and second display areas 141 and 142 and then sets the device 10 in the corresponding device placement display column 1422. Then when the user presses the setting button 143, the screen control unit 331 controls to blink the split screens 261' and 262' respectively to start the visible light communication for transmitting the data to each of the 10 devices sequentially. As a result, the SSID and the password, as well as data on the object name and the number of objects for each device, are transmitted from the terminal 13 to each device 10.

In the above example the first display area 141 for the SSID and the password and the second display area 142 for multiple devices are on the same screen. But according to another example, the first display area 141 and the second display area 142 may each be located on a separate display screen. The number of devices displayed in the second display area 142 may be increased or decreased as needed.

According to the embodiment 2, by placing multiple devices on the screen of a single terminal, it is possible to perform all at once data communication to multiple devices to register necessary data to each device. In addition, since it is no longer necessary to set the timing and threshold values associated with the visible light communication for each device individually, data registration to the devices is made more efficient.

Embodiment 3

The present invention is not limited to the above embodiments 1 and 2 and may be modified or applied in various ways. Some other examples are described below.

Example of the Management Server 12

In the embodiment 1, the management server 12 is a computer, but according to another example, the functions of the management server 12 can be realized using a cloud computer or a cloud service. In other words, some or all of the functions shown in FIG. 4 can be implemented in the cloud computer or by the cloud service. For example, by using an ASP (Application Service Provider) or API (Application Programming Interface) of the cloud service the functions for the device management table 403 and the object management table 404 as well as reading and writing data to and from these management tables can be realized.

Example of an Object Management Table

In embodiment 1, the object management table 404 in the management server 12 is an inventory management table that manages raw materials for garments. According to another example, the object management table may be a table that manages inventory objects of manufactured garments, e.g., shirts, pants, jackets, and other goods.

The object management table does not have to be a stand-alone structure by itself. For example, in the case of a system in which a series of processes from raw materials to production and distribution of goods are managed as SCM (Supply Chain Management), it is also possible to select data from SCM for inventory management of raw materials and products and use it as in embodiment 1.

In addition, a column for registering device IDs is provided in the object management table 404 and the device IDs that have been successfully tied may be registered in correspondence with the object ID.

Note that we may use a term of goods, article, item, and material, etc., instead of "object" that is used in the object management table 404 and others in the embodiment 1.

Example of Object ID

In embodiment 1, the object ID is used to identify the object, but it may be used for other means or purposes. For example, information that identifies or is associated with data such as the target or physical quantity to be detected by the device, or information such as an address that identifies the device, or information that the device uniquely has or is assigned, may be used as the target identification information. In this case, it would be referred to as a detection target management table (e.g., temperature management table) instead of the above-mentioned object management table 404.

Example 1 of Device 10

In Embodiment 1, counter 10 inputs numerical values by operating the button 21, but an input means or a data acquisition unit is not limited to the button. For example, instead of the button 21, a voice microphone is provided, and the voice input from this voice microphone can be recognized as the data of the numerical value by a voice recognition function of a voice recognition program executed by the control unit 22.

Example 2 of Device 10

In Embodiment 1, the device 10 is a counter that detects the number of the object in an example applied to an inventory management system. According to another example, the device 10 is not limited to the counter in embodiment 1 and can be applied to other areas besides inventory management. For example the device 10 can be applied to sensors that detect physical quantity or change in an object, such as infrared sensors, distance sensors, weight sensors, humidity sensors, temperature sensors, etc. In this case, the infrared sensor or the temperature sensor, etc. is connected instead of the button 21 in embodiment 1 and the memory 222 stores the physical data such as the quantity or the change detected by the sensor. The sensor works as the input means or the data acquisition unit in these cases. The object ID in embodiment 1 can be a unique identification ID that identifies the object or physical quantity or device that the sensor detects. The control unit 22 transmits the data of the physical quantity or other data detected by the sensor together with the unique identification ID to an external device such as a management server that has requested detection.

Device 10 Initial Settings

In embodiment 1, the initial setup of management information and object data is performed on device 10 with the format shown in FIG. 10. According to another example, various initial settings other than management information and object data can be performed.

For example, if an energy-saving mode (sleep mode) function is provided after a certain period of time has elapsed after pressing a button on the device 10, the time until sleep can be initially set.

Another example is the setting for monitoring the remaining battery level. For example, the remaining battery charge can be monitored by sending the remaining battery charge to the management server when a button is pressed. In this case, the initial settings can be made to either send the remaining battery level to the management server or to generate an alarm on the device.

Another example is the setting of the volume of the button operation sound. For example, a buzzer can be provided on the device 10 to make the counter value go up or down fast when the button is pressed and held. In this case, the volume of the buzzer can be set initially.

The initial setting of the above functions does not necessarily need to be performed at the same time as the initial setting of management information and object data in embodiment 1, but may be performed as needed thereafter. The initial setting of the above functions is also done using visible light communication as in embodiment 1.

Example of Communication Between Terminal 13 and Device 10

The optical element 261 works for receiving clock and the optical element 262 works for receiving data with the visible lights that is emitted by the corresponding split screens of the terminal 13 in embodiment 1, but another example is not limited to this. For example, the device 10 having only one light receiving element may be configured to receive visible light of data signals emitted by the light emitting part of the terminal 13. In this case, there is no light receiving element to receive the synchronization clock as in embodiment 1, but if the data time width of one bit constituting the data and the data start position (predetermined code data) are known in advance, the processing unit 221 of the device can recognize a data start position and data consisting of a sequence of 0 and 1 based on a blink of visible light (i.e., a "1" or "0") received by a light-receiving element and the time width of the blink.

As another example, the multiple light-receiving elements may all be used for data reception. In this case, corresponding to the multiple light-receiving elements, multiple data are transmitted in multiplex from the multiple split screens or multiple light-emitting part possessed by the terminal 13, and the multiple light-receiving elements of the device 10 receive the data in multiplex. For an example one light receiving element out of three or more light receiving elements may be used for synchronization clock reception.

Another example is not limited to blinking the split screen of the transmitting terminal. For example, the transmitting device may have one or more light emitting elements (light emitting part) at positions corresponding to one or more light receiving elements of the receiving device and control the light emitting elements to blink in response to transmitted data.

Example of Communication Interface Between Device 10 and Management Server 12

Wi-Fi is used as a wireless communication interface between the device 10 and the management server 12 in embodiment 1, but it is not limited to this. For example, ZigBee (registered trademark) and LTE (Long Term Evolution) can also be used. For example, Zigbee is useful as a wireless communication interface that transmits data at regular intervals because it can be connected to many devices, has low standby power during sleep mode and has a short recovery time. The method of embodiment 1 can be applied to setting management information such as addresses and operating modes for this Zigbee.

The invention claimed is:

1. A device management method in a system in which a device is connected to a first apparatus and a second apparatus via a network, wherein
said second apparatus transmits predetermined information used by the device to the device via a second interface by visible light communication,
said device transmits the data acquired by an acquisition unit to the first apparatus via a first interface using the predetermined information,
said second apparatus transmits management information as said predetermined information for using the first interface to the device via the second interface,
said device stores the received management information in a memory, and
said device transmits the data acquired by the acquisition unit via the first interface using said management information.

2. The device management method according to claim 1, wherein
said first interface is Wi-Fi, and
said second apparatus sends an SSID and password that are used for Wi-Fi as said management information to the device via said second interface.

3. The device management method according to claim 2, wherein
said second apparatus is a terminal having an input unit, a display unit, a control unit, and a memory unit,
said input unit accepts input of the SSID and password,
said display unit displays the SSID and password received by the input unit on a display screen, and
said control unit transmits the SSID and password displayed on the display screen, in accordance with an instruction of said input unit, to the device via the second interface.

4. A method for managing objects according to claim 1, wherein
the first apparatus is a server and the second apparatus is a terminal,
said device and the server are connected via the first interface,
said terminal and the device are connected via the second interface with visible light communication,
said server includes:
an object management table that keeps an object ID unique to an object for each of a plurality of objects and the number of the objects corresponding to the object ID, and
an object management unit for managing the correspondence between the object and the object ID and the number of objects in said object management table,
said terminal obtains the object ID from the server, and transmits the object ID and the management information for the device to use the first interface to said device via the second interface,
said device stores the received object ID and the management information in the memory, and transmits data pertaining to the number of objects corresponding to the object ID to the server via the first interface based on the management information, and
said object management unit of said server updates said data pertaining to the number of said objects corresponding to said object ID transmitted from said device in said object management table.

5. A device management method in a system in which a device is connected to a first apparatus and a second apparatus via a network, wherein
said second apparatus transmits predetermined information used by the device to the device via a second interface by visible light communication, and said device transmits the data acquired by an acquisition unit to the first apparatus via a first interface using the predetermined information,
said second apparatus receives the predetermined information related to the acquisition of the data by the device from the first apparatus and transmits the predetermined information to the device via the second interface,
said device stores the received predetermined information in a memory, and
said device transmits the data acquired by the acquisition unit in association with the predetermined information via the first interface.

6. A device management method in a system in which a device is connected to a first apparatus and a second apparatus via a network, wherein said second apparatus transmits predetermined information used by the device to the device via a second interface by visible light communication, and said device transmits the data acquired by an acquisition unit to the first apparatus via a first interface using the predetermined information, said acquisition unit of said device is a sensor that detects a physical quantity or a change of an object, and said device further comprises a processing unit that generates data concerning said physical quantity detected by said sensor.

7. A device management method in a system in which a device is connected to a first apparatus and a second apparatus via a network, wherein said second apparatus transmits predetermined information used by the device to the device via a second interface by visible light communication, said device transmits the data acquired by an acquisition unit to the first apparatus via a first interface using the predetermined information, said device is a counter, said acquisition unit is an input button that instructs addition or subtraction, and said device further comprises a processing unit that generates data pertaining to the number of objects by adding or subtracting according to an instruction of the input button.

8. A device management system in which a device is connected to a first apparatus and a second apparatus via a network, wherein said device has an acquisition unit for acquiring data, said second apparatus transmits the predetermined information used by the device to the device via a second interface by visible light communication, said device transmits data acquired by said acquisition unit to the first apparatus via a first interface using the predetermined information, said second apparatus transmits management information as said predetermined information for using the first interface to the device via the second interface, said device stores the received management information in a memory, and said device transmits the data acquired by said acquisition unit via the first interface using the management information.

9. An object management system according to claim 8, wherein the first apparatus is a server and the second apparatus is a terminal, said device and the server are connected via the first interface, said terminal and said device are connected via the second interface with visible light communication, said server comprises:

an object management table that keeps an object ID unique to an object for each of a plurality of objects and the number of the objects corresponding to the object ID, and an object management unit for managing the correspondence between the object and the object ID and the number of objects in said object management table, said terminal comprises:

an input unit that accepts said management information for the device to use the first interface, a wireless communication unit, and a control unit transmits the management information accepted by the input unit and the object ID obtained from the server via said wireless communication unit to the device via the second interface, said device comprises:

a memory that stores the received object ID and the management information, an input means for inputting data pertaining to the number of objects corresponding to the object ID, and a control unit for transmitting the number of objects accepted by the input means to the server via the first interface based on the management information, and said object management unit of said server updates said data pertaining to the number of said objects corresponding to said object ID transmitted from said device in said object management table.

10. The object management system according to claim 9, wherein said first interface is Wi-Fi, and said management information is an SSID and password required to use Wi-Fi.

11. The object management system according to claim 9, wherein said device is a counter, said counter has an add button to instruct addition and a subtract button to instruct subtraction as said input means, and said control unit has a processing unit that generates said data pertaining to the number of objects by adding or subtracting according to the instruction of the add button or the subtract button.

12. A device management system in which a device is connected to a first apparatus and a second apparatus via a network, wherein said device has an acquisition unit for acquiring data, said second apparatus transmits the predetermined information used by the device to the device via a second interface by visible light communication, said device transmits data acquired by said acquisition unit to the first apparatus via a first interface using the predetermined information, said second apparatus receives the predetermined information related to the acquisition of the data by the device from the first apparatus and transmits the predetermined information to the device via the second interface, said device stores the received predetermined information in a memory, and said device transmits the data acquired by the acquisition unit in association with the predetermined information via the first interface.

13. A communication method between a device and a terminal, wherein said device has an acquisition unit for acquiring data, a memory for storing at least the data acquired by the acquisition unit, an optical unit for receiving visible light, a wireless communication unit for wireless transmission of data to another device via a first interface, and the first control unit for controlling the acquisition unit, the memory, and the optical unit and the wireless communication unit, said terminal has an input unit, a display unit and a second control unit, the method comprising the steps of:

displaying predetermined information used by the device on the display screen of the display unit at the terminal, transmitting the predetermined information to the device via the second interface by visible light communication with the side with the optical unit of the device facing the display screen of the terminal at the terminal, receiving said predetermined information transmitted via the second interface by said optical unit at said device, storing said predetermined information received by said optical unit in said memory at said device; and transmitting the data stored in the memory to the another device via the first interface based on the predetermined information at said device.

14. The communication method according to claim 13, wherein said first interface is Wi-Fi, and said predetermined information is an SSID and password required to use Wi-Fi.

15. The communication method according to claim 13, wherein said optical unit has one or more light receiving elements controlled by the first control unit, and said second control unit performs visible light communication by blinking one or more light emitting part corresponding to the one or more light receiving elements.

16. The communication method according to claim 13, wherein said optical unit of said device has a first light receiving element that receives a clock and a second light receiving element that receives said predetermined information in synchronization with the clock by the first light receiving element during visible light communication, and said second control unit blinks the first split screen facing the first light receiving element and the second split screen facing the second light receiving element on the display screen to perform visible light communication.

17. The communication method according to claim 16, wherein the second control unit switches the second split screen to transmit the predetermined information after a transmission preparation period blinking the first split screen and the second split screen has passed.

18. A method of communication between a device and a terminal, wherein said device has one or more light receiving elements that receive visible light and said terminal has an input unit, a display unit, and a control unit, comprising:

positioning one or more light emitting part of the terminal opposite the one or more light receiving elements of the device, blinking by the control unit the one or more light emitting part to transmit information input from the input unit in visible light, and receiving the information from the one or more light receiving elements by the device, wherein the display unit of the terminal displays a display screen having one or more display areas divided into one or more split screens corresponding to the plurality of devices, each of plurality of said devices is positioned on said one or more display areas, and the control unit performs visible light communication by blinking each of the one or more split screens in the one or more display areas.

19. The communication method according to claim 18, wherein said terminal displays said information entered from said input unit or obtained from other device on the display screen of said display unit, and said control unit controls blinking of the split screen based on said information.

* * * * *